(12) United States Patent
Seo et al.

(10) Patent No.: US 9,908,314 B2
(45) Date of Patent: Mar. 6, 2018

(54) LAMINATION APPARATUS FOR FLEXIBLE DISPLAY AND LAMINATION METHOD USING THE SAME

(71) Applicant: SAMSUNG DISPLAY CO., LTD., Yongin, Gyeonggi-Do (KR)

(72) Inventors: Dong Woo Seo, Seoul (KR); Hye Yeon No, Busan (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 240 days.

(21) Appl. No.: 14/803,288

(22) Filed: Jul. 20, 2015

(65) Prior Publication Data

US 2016/0207295 A1 Jul. 21, 2016

(30) Foreign Application Priority Data

Jan. 20, 2015 (KR) .................. 10-2015-0009412

(51) Int. Cl.
*B32B 37/10* (2006.01)
*G06F 1/16* (2006.01)
*B32B 37/12* (2006.01)

(52) U.S. Cl.
CPC ............ *B32B 37/10* (2013.01); *G06F 1/1652* (2013.01); *B32B 37/1018* (2013.01); *B32B 37/12* (2013.01); *B32B 2457/20* (2013.01)

(58) Field of Classification Search
CPC ........................... B29C 66/342; B29C 66/345
See application file for complete search history.

(56) References Cited

U.S. PATENT DOCUMENTS

| 4,927,479 | A | * | 5/1990 | Bock | ...................... B30B 15/06 156/228 |
| 5,733,410 | A | * | 3/1998 | Gore | ...................... B29C 63/02 156/542 |

FOREIGN PATENT DOCUMENTS

| KR | 10-2008-0062424 A | 7/2008 |
| KR | 10-2010-0088823 A | 8/2010 |

* cited by examiner

*Primary Examiner* — Jeffry H Aftergut
(74) *Attorney, Agent, or Firm* — Lee & Morse, P.C.

(57) ABSTRACT

A lamination apparatus for laminating a flexible member and an adhesive layer of a flexible display device includes a compressor including a first surface with a first curvature radius, a push rod connected to the compressor, the push rod having a circumferential surface with a smaller second curvature radius than the first curvature radius of the compressor; and an actuator connected to the push rod, actuator moving the push rod to apply a force for lamination.

4 Claims, 5 Drawing Sheets

LAMINATION APPARATUS FOR FLEXIBLE DISPLAY AND LAMINATION METHOD USING THE SAME

CROSS-REFERENCE TO RELATED APPLICATION

Korean Patent Application No. 10-2015-0009412, filed on Jan. 20, 2015, in the Korean Intellectual Property Office, and entitled: "Lamination Apparatus for Flexible Display and Lamination Method Using the Same," is incorporated by reference herein in its entirety.

BACKGROUND

1. Field

Embodiments relate to a lamination apparatus, and for example, to a lamination apparatus for a flexible display device.

2. Description of the Related Art

Flexible display devices that have a characteristic of being easily bent or curved have recently been gaining more attention. In order for a completed flexible display device to have a flexible property that is desired by a user, each component (e.g., a substrate, a window, etc.) of the flexible display device should have a flexible property.

SUMMARY

Embodiments are directed to a lamination apparatus for laminating a flexible member and an adhesive layer of a flexible display device, the lamination apparatus including a compressor including a first surface with a first curvature radius, a push rod connected to the compressor, the push rod having a circumferential surface with a smaller second curvature radius than the first curvature radius of the compressor; and an actuator connected to the push rod, actuator moving the push rod to apply a force for lamination.

The compressor may include rails at opposite edges of a second surface facing a first surface. The push rod is movable along the rails.

The rails may have a curvature matching a curvature of the first surface.

The actuator may include a mover to which the push rod is connected, the mover including a through-hole formed with a thread, a rotation shaft screw-coupled to the through-hole, and a driving source that applies torque to the rotation shaft.

The first curvature radius of the first surface may exceed 300 mm.

A flexible display panel, a touch screen panel, a polarizer, and a window may be laminated to form the flexible display device. The flexible members may include at least one of the flexible display panel, the touch screen panel, the polarizer, and the window.

The adhesive layer may be an optically clear adhesive.

Embodiments are also directed to a lamination method for laminating a flexible member and the adhesive layer, the lamination method including pressing the flexible member and the adhesive layer using the lamination apparatus.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
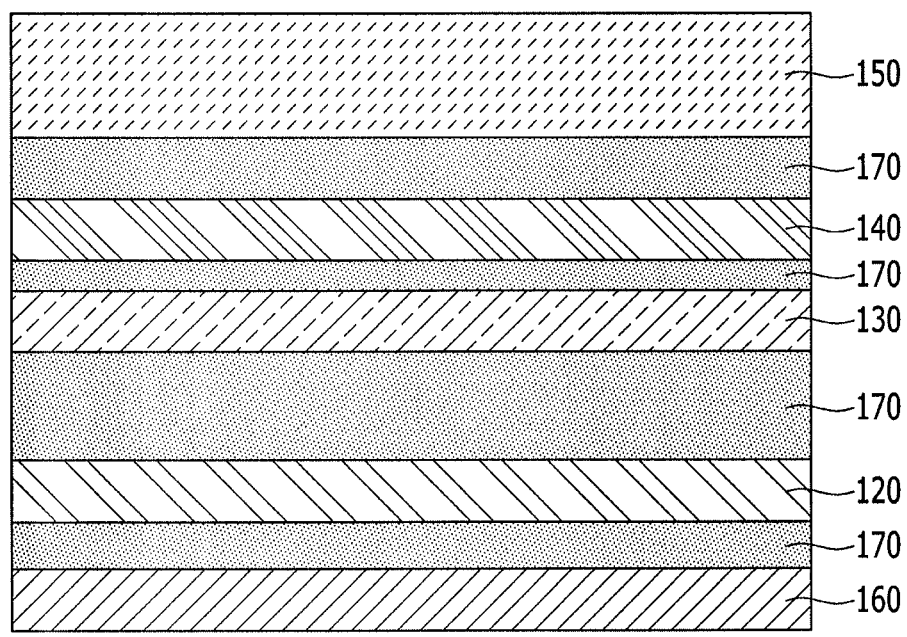
FIG. 1 illustrates a schematic cross-sectional view of a flexible display device according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

FIG. 1 illustrates a schematic cross-sectional view of a flexible display device according to an exemplary embodiment.

The flexible display device 10 according to the current exemplary embodiment may have a stacked structure in which a touch screen panel 130, a polarizer 140, and a window 150 are layered on a flexible display panel 120.

A protection film 160 may be provided on one surface of the flexible display panel 120 that faces the touch screen panel 130.

In this case, adhesive layers 170 may be provided between respective members (hereinafter referred to as flexible members for convenience) to combine the aforementioned flexible members via the adhesive layers 170. In some implementations, the adhesive layers 170 may be formed of an optically clear adhesive (OCA). A laminating order of the aforementioned flexible members may vary from what is illustrated in FIG. 1. For example, the laminating order of the touch screen panel, the polarizer, and the window may be appropriately selected on the flexible display panel, and if desired, any member may be omitted.

In order to display an image, the flexible display panel 120 may have a configuration in which a plurality of pixels are provided on a flexible substrate (e.g., plastic film).

The flexible display panel 120 may be mainly formed of the flexible substrate to have a flexible property. The flexible display panel 120 may be formed as a curved, bendable, or foldable panel.

A process of laminating the adhesive layers 170 may be performed when manufacturing the flexible display device 10.

Lamination of the adhesive layer 170 and the flexible member using a lamination apparatus according to an embodiment will now be described.

Figure 2:
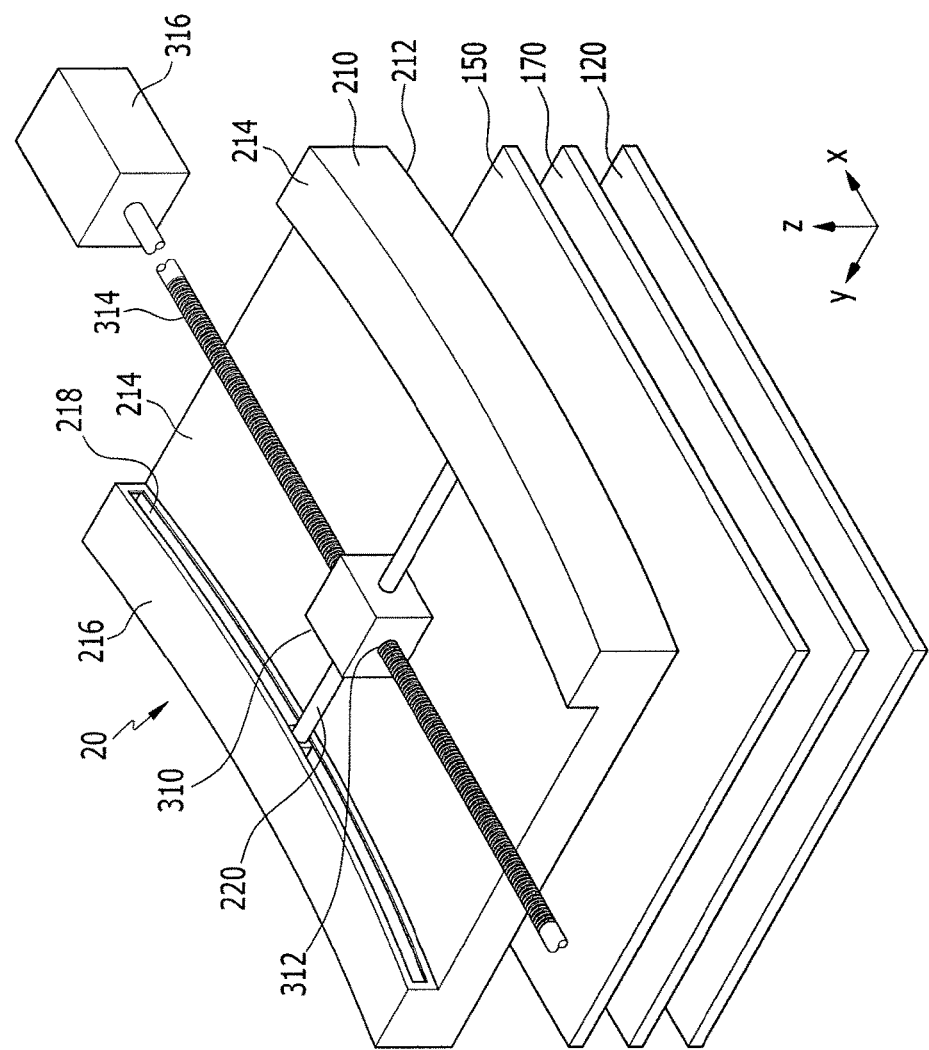
FIG. 2 illustrates a perspective view for illustrating the lamination apparatus for the flexible display device according to the exemplary embodiment.

FIG. 2 illustrates a schematic diagram of the lamination apparatus according to the exemplary embodiment.

As illustrated, the lamination apparatus 20 may include a compressor 210 that presses the flexible member and the adhesive layer 170.

The compressor 210 may have a shape with a curvature along a first direction (x-axis direction). For example, a first surface 212 of the compressor 210 may have a first curvature radius Rx that exceeds 300 mm.

In the lamination process, a vacuum hole that vacuum-absorbs an object to be laminated may be formed on the first surface 212 of the compressor 210.

Rails 216 may be formed along the first direction (x-axis direction) at opposite edges of a second surface 214 of the compressor 210 that faces the first surface 212. Both of the rails 216 may have a curvature that corresponds to the curvature of the first surface 212.

A push rod 220 may be provided in the rails 216. The push rod 220 may be movable along a length direction of the rails 216.

Wheels may be installed at opposite ends of the push rod 220. The wheels may be installed to be rollable along a guide groove 218 in the rails 216.

A circumferential surface of the push rod 220 may be formed such that it has a second curvature radius, the second curvature radius being smaller than the first curvature radius of the first surface 212 of the compressor 210.

Accordingly, when a predetermined force is applied to the push rod 220, the wheels may be rotated in the guide groove 218 to allow forward or backward movement of the push rod 220 along the first direction (x-axis direction).

A guide may be installed on the second surface 214 of the compressor 210 to facilitate the movement of the push rod 220.

Next, an actuator, which allows the movement described above to apply a force for the lamination, will be described.

The push rod 220 may be fixedly installed in the actuator. The push rod 220 may include a mover 310 with a through-hole 312 formed through a center part thereof.

The mover 310 may be positioned approximately at a center of the compressor 210. A screw thread may be formed at an inner circumferential surface where the through-hole 312 is formed.

The push rod 220 may be fixedly installed at an opposite external circumferential surface of the mover 310 while being disposed thereat. Accordingly, as the push rod 220 moves forward and backward, the mover 310 may move together with the push rod 220.

A rotation shaft 314 having an external circumferential surface formed with a screw thread may be screw-coupled to the through-hole 312 of the mover 310. The rotation shaft 314 may be fixedly installed on the compressor 210 to only allow for rotational movement. The rotation shaft may be connected to a driving source 316 such as a motor to provide the rotational movement.

In the lamination apparatus 20 configured as such, when the rotation shaft 314 rotates by receiving torque from the driving source 316, the mover 310 and the push rod 220 screw-coupled to the rotation shaft 314 are movable forward or backward along the rotation shaft 314 in the first direction (x-axis direction) such that the compressor 210 may laminate the flexible member and the adhesive layer 170 along the curvature created on the first surface 212 using the force applied from the push rod 220.

Figure 3A:
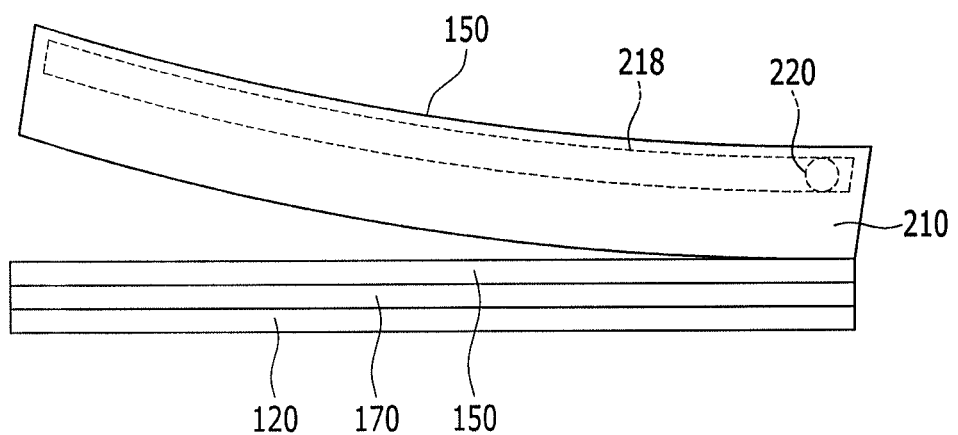
FIGS. 3A, 3B, and 3C illustrate drawings for illustrating operations of the lamination apparatus for the flexible display device according to the exemplary embodiment.
Figure 3B:
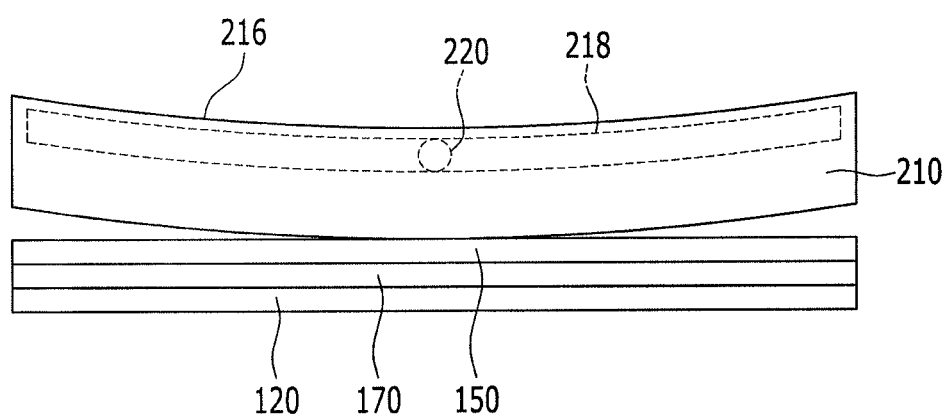
Figure 3C:
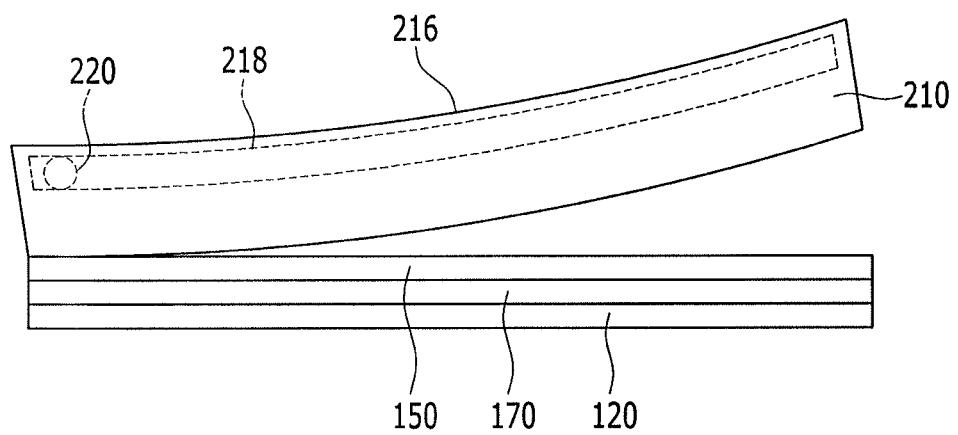

FIGS. 3A to 3C illustrate drawings depicting a process of laminating the flexible member and the adhesive layer 170 using the lamination apparatus according to the exemplary embodiment.

In FIGS. 3A to 3C, the flexible members are the flexible display panel 120 and the window 150, as examples.

While the flexible members, including an adhesive layer 170 interposed between the flexible display panel 120 and the window 150, are placed on a worktable, one end of the compressor 210 may contact one end of the window 150.

In this case, the push rod 220 may be positioned at one end of the rails 216 (FIG. 3A).

An aligner may be installed on the worktable and the first surface 212 of the compressor 210 for a precise lamination process. The aligner may include a concave portion provided on the worktable and a convex portion formed in the first surface 212 of the compressor 210.

When the rotation shaft 314 is rotated by the driving source 316, the mover 310 screw-coupled to the rotation shaft 314 also moves. The push rod 220 also moves forward along the rails 216.

Accordingly, the compressor 210 may be pressed by the force that the push rod 220 applies, such that the compressor starts pressing the adhesive layer 170 and the flexible display panel 120 along with the window 150 using the curvature of the first surface 212.

According to such an operation, the compressor 210 may perform the lamination of the window 150, the adhesive layer 17, and the flexible display panel 120 while deforming the first surface 212 to contact the window 150 from the state illustrated in FIG. 3A (refer to FIGS. 3B and 3C).

As described above, when the flexible member and the adhesive layer of the flexible display device are laminated using the lamination apparatus, a contact area of the object to be laminated for contacting the compressor 210 may become larger, such that curling of the object to be laminated that could occur after the lamination may be prevented or reduced.

With the lamination apparatus and method for the flexible display device according to the exemplary embodiment, a member that allows for a larger pressing area of the adhesive layer may be used when laminating the flexible member and the adhesive layer. The curling that could occur in the flexible display panel assembly after adhesion may be prevented. Accordingly, not only may appearance quality of the flexible display device be favorably maintained, but high quality products may be provided to consumers.

By way of summation and review, an appropriate apparatus and method for manufacturing the flexible display device is desirable.

Embodiments advance the art by providing a lamination apparatus for a flexible display device that is capable of preventing occurrence of curling in an assembly formed by lamination of a flexible member and an adhesive layer.

In addition, the present invention provides a lamination manufacturing method using the aforementioned lamination apparatus.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:

1. A lamination apparatus for laminating a flexible member and an adhesive layer of a flexible display device, the lamination apparatus comprising:
   a compressor including a first surface with a first curvature radius and rails at opposite edges of a second surface facing the first surface, the rails having a curvature matching a curvature of the first surface;
   a push rod connected to the compressor, the push rod having a circumferential surface with a smaller second curvature radius than the first curvature radius of the compressor; and
   an actuator connected to the push rod to move the push rod along the rails to apply a force for lamination.

2. The lamination apparatus as claimed in claim 1, wherein the first curvature radius of the first surface exceeds 300 mm.

3. A lamination apparatus for laminating an adhesive layer that includes an optically clear adhesive and a flexible member that includes at least one of a flexible display panel, a touch screen panel, a polarizer and a window, the lamination apparatus comprising:
- a compressor including a first surface with a first curvature radius and rails at opposite edges of a second surface facing the first surface, the rails having a curvature matching a curvature of the first surface, the compressor being positionable relative to the flexible member and the adhesive layer such that the flexible member and the adhesive layer are under the first surface of the compressor;
- a push rod connected to the compressor, the push rod having a circumferential surface with a smaller second curvature radius than the first curvature radius of the compressor; and
- an actuator connected to the push rod, actuator moving to move the push rod along the rails to apply a force for lamination of the flexible member and the adhesive layer.

4. A lamination apparatus for laminating a flexible member and an adhesive layer of a flexible display device, the lamination apparatus comprising:
- a compressor including a first surface with a first curvature radius;
- a push rod connected to the compressor, the push rod having a circumferential surface with a smaller second curvature radius than the first curvature radius of the compressor; and
- an actuator connected to the push rod, actuator moving the push rod to apply a force for lamination,
- wherein the actuator includes a mover to which the push rod is connected, the mover including a through-hole formed with a thread, a rotation shaft screw-coupled to the through-hole, and a driving source that applies torque to the rotation shaft.

* * * * *